(12) United States Patent
Sones

(10) Patent No.: US 11,977,002 B2
(45) Date of Patent: May 7, 2024

(54) SOFT TARGET MOVEMENT PLATFORM

(71) Applicant: Anthony Best Dynamics Ltd., Wiltshire (GB)

(72) Inventor: James Sones, Wiltshire (GB)

(73) Assignee: Anthony Best Dynamics Ltd., Wiltshire (GB)

( * ) Notice: Subject to any disclaimer, the term of this patent is extended or adjusted under 35 U.S.C. 154(b) by 617 days.

(21) Appl. No.: 17/253,800

(22) PCT Filed: Jun. 21, 2019

(86) PCT No.: PCT/GB2019/051753
§ 371 (c)(1),
(2) Date: Dec. 18, 2020

(87) PCT Pub. No.: WO2019/243838
PCT Pub. Date: Dec. 26, 2019

(65) Prior Publication Data
US 2021/0255064 A1    Aug. 19, 2021

(30) Foreign Application Priority Data

Jun. 22, 2018  (GB) ............................... 1810311
Jun. 22, 2018  (GB) ............................... 1810313

(51) Int. Cl.
*B62D 1/00* (2006.01)
*B62D 5/00* (2006.01)
(Continued)

(52) U.S. Cl.
CPC ............... *G01M 17/06* (2013.01); *B62D 1/00* (2013.01); *B62D 5/001* (2013.01);
(Continued)

(58) Field of Classification Search
CPC ..... B62D 1/00; B62D 5/001; G01M 17/0078; G09B 9/042
See application file for complete search history.

(56) References Cited

U.S. PATENT DOCUMENTS 8,447,509 B2    5/2013  Kelly et al.
9,428,231 B2 *  8/2016  Beard ................. B62D 55/075
(Continued)

FOREIGN PATENT DOCUMENTS

CN    103648592 A    3/2014
CN    104163085 A    11/2014
(Continued)

OTHER PUBLICATIONS

English Translation of Notice of Reasons for Rejection dated May 19, 2023 in related Japanese Application No. P2020-569124; 6 pages.
(Continued)

*Primary Examiner* — Erez Gurari
(74) *Attorney, Agent, or Firm* — Sterne, Kessler, Goldstein & Fox P.L.L.C.

(57) ABSTRACT

A soft target movement platform (1) which comprises at least one drive unit (11), each unit having a motor carrier (12). The drive motor (21) is preferably journaled in the motor carrier about an axis central and longitudinal of the motor. A drive wheel (6) is drivingly connected to the drive motor, with the wheel's axis of rotation offset from the central longitudinal axis by a lever arm (31). The lever arm having a horizontal extent in use, whereby wheel load tends to rotate the motor with respect to the carrier about the longitudinal axis. A spring (32) acting between the drive motor and the carrier counteracts the wheel load rotation.

23 Claims, 11 Drawing Sheets

(51) Int. Cl.
*G01M 17/007* (2006.01)
*G01M 17/013* (2006.01)
*G01M 17/06* (2006.01)
*G09B 9/042* (2006.01)

(52) U.S. Cl.
CPC ...... *G01M 17/0078* (2013.01); *G01M 17/013* (2013.01); *G09B 9/042* (2013.01)

(56) References Cited

U.S. PATENT DOCUMENTS

| | | | |
|---|---|---|---|
| 10,718,690 B2 * | 7/2020 | Jeong | G01M 17/007 |
| 11,505,134 B1 * | 11/2022 | Kuwae | G05D 1/028 |
| 2008/0308324 A1 * | 12/2008 | Moser | B62D 55/125 |
| | | | 180/6.7 |
| 2009/0001740 A1 * | 1/2009 | Kofoed | A61G 1/0293 |
| | | | 296/20 |
| 2013/0018526 A1 | 1/2013 | Kelly et al. | |
| 2013/0018528 A1 * | 1/2013 | Kelly | B60T 7/18 |
| | | | 701/41 |
| 2016/0377508 A1 | 12/2016 | Perrone et al. | |
| 2020/0003658 A1 | 1/2020 | Hafellner et al. | |
| 2020/0170186 A1 * | 6/2020 | Curtis | F16H 25/20 |
| 2021/0088417 A1 * | 3/2021 | Gustafsson | G01M 17/007 |
| 2021/0394818 A1 * | 12/2021 | Zinnecker | B62D 3/08 |
| 2022/0185264 A1 * | 6/2022 | Wirthl | B60W 30/08 |

FOREIGN PATENT DOCUMENTS

| | | |
|---|---|---|
| CN | 206348155 U | 7/2017 |
| CN | 107132054 A | 9/2017 |
| CN | 108106859 A | 6/2018 |
| EP | 2657672 A1 | 10/2013 |
| GB | 2194458 A | 3/1988 |
| KR | 100457810 B1 | 11/2004 |
| KR | 20180058686 A | 6/2018 |
| WO | 2013009306 A1 | 1/2013 |
| WO | 2016061236 A1 | 4/2016 |
| WO | 2018007458 A2 | 1/2018 |

OTHER PUBLICATIONS

Pingxia Zhang et al., "Study on control schemes of flexible steering system of a multi-axle all-wheel-steering robot," Advances in Mechanical Engineering, Jun. 2016, vol. 8, No. 6, pp. 1-13, DOI: 10.1177/1687814016651556.
Zhang et al., Study on control schemes of flexible steering system of a multi-axle all-wheel-steering robot, Advances in Mechanical Engineering, Jun. 2, 2016, pp. 1-13, vol. 8 No. 6, ISSN: 1687-8140, DOI: 10.1177/1687814016651556.
English Translation of Chinese First Search Report, Related Chinese Application No. 201980042042.2; IPC Number Assigned by the Examiner: G01M17/007.
"Design of an Omnidirectional Mobile Platform based on Powered Universal Wheel," Weijun et al., DOI: 10.16578/j.issn.1004.2539. 2016.10.017 (2016).

* cited by examiner

SOFT TARGET MOVEMENT PLATFORM

The present invention relates to a soft target movement platform.

Soft target movement platforms are described in a series of patents in the name of Dynamic Research Inc (DRI). In particular, the abstract of U.S. Pat. No. 8,447,509 is as follows:

A Guided Soft Target (GST) system and method provides a versatile test system and methodology for the evaluation of various crash avoidance technologies. This system and method can be used to replicate the pre-crash motions of the CP in a wide variety of crash scenarios while minimizing physical risk, all while consistently providing a sensor signature substantially identical to that of the item being simulated. The GST system in various example embodiments may comprise a soft target vehicle or pedestrian form removably attached to a programmable, autonomously guided, self-propelled Dynamic Motion Element (DME), which may be operated in connection with a wireless computer network. Specific geometries for the DME have been discovered that minimize the risk of the DME flipping up and hitting or otherwise damaging or disrupting the ride of typical test vehicles during impact of the test vehicles with the GST, all while minimizing the effect of the DME on the sensor signature of the GST.

We use the term "soft target movement platform" where DRI use "dynamic motion element".

The object of the present invention is to provide an improved soft target movement platform.

According to the first aspect of the invention there is provided a soft target movement platform, comprising:
at least one of drive unit, the or each unit having:
  a motor carrier,
  a drive motor, journaled in the motor carrier about an axis longitudinal of the motor,
  a drive wheel drivingly connected to the drive motor, with the wheel's axis of rotation offset from the longitudinal axis by a lever arm having a horizontal extent in use, whereby wheel load tends to rotate the motor with respect to the carrier about the longitudinal axis and
  a spring acting between the drive motor and the carrier to counteract the wheel load rotation.

Whilst the wheel and a rotor of the motor could be coaxial with an offset to the rotor and wheel axes from the longitudinal journal axis, preferably the journal axis and the rotor axis are coaxial with the wheel axis being offset and drive transfer means being provided between the motor's rotor and the wheel, the drive transfer means providing the lever arm.

The spring could be a torsion spring acting between the carrier and a body of the motor. However, preferably the spring is a compression or spring acting longitudinally of the journal axis and reacting wheel load applied to it via a mechanism to the motor body. The mechanism could comprise a linkage including a direction changer such as a bell crank; but it preferably comprises a cable passing around a direction changing pulley and onto a capstan portion of the motor body.

A single drive unit of the invention or indeed a lesser number than the number of wheels of the platform can be provided, in which case the platform's other wheels can be sprung in a different manner or they can be sprung in the same manner without provision of motors for the non-driven wheels. However, preferably each of the wheels of the platform may be provided with a drive unit of the invention.

Preferably for steering of the platform, the or at least some of the drive units are steerable by providing the carriers of the drive units with steering pivots. Whilst these could be at the wheel end of the respective carriers, placing them close to the wheel's ground contact patch; in the preferred embodiment, the steering pivots are place close to the middle of the carriers, to restrict the overall space requirement for the motor, wheel and carrier in total steering movement.

According to the second aspect of the invention there is provided a soft target movement platform, comprising:
at least one front steerable wheel at a front axle,
at least one rear steerable wheel at a rear axle,
a mechanism for selective steering of the front and rear wheels to respective steering angles, independently or dependently of the rear and front wheels for steering the platform substantially about a point of intersection of axes of the front and rear steerable wheels,
  the mechanism being such that the point of intersection is selectively moveable laterally for quantum of steering movement and backwards and forwards for mode of steering movement and
means for controlling the mechanism for quantum and mode of steering.

Normally the soft target movement platform has a central longitudinal axis, and the steerable wheels will be arranged as three or four wheels of which:
at least one wheel is arranged at a front axle position along the central longitudinal axis,
at least one other wheel is similarly arranged at a rear axle position and
the other wheel or wheels is/are arranged at the axles whereby there are one or two front wheels and one or two rear wheels.

Where a single wheel is provided at an axle position, it will normally be substantially on the central longitudinal axis.

Where two wheels are provided at an axle position:
they will normally be provided substantially equally spaced on either side of the central longitudinal axis;
they will also normally be provided at substantially the same position along the axis; and
  they may be on a single physical axle, such as a live axle or
  they may be provided independently in a notional axle.

The axles will normally be substantially at right angles to the central longitudinal axis. Nevertheless there is no requirement for full symmetry of positioning of the opposite side wheels with respect to the central axis.

We can envisage a configuration with front and rear axles on the central axis and balance wheels to either side to keep the platform level. The balance wheels could be arranged as castor wheels.

We can also envisage configurations with more than four wheels.

The soft target movement platform may be longer in the central longitudinal axis direction than its width, the axles being transverse to this axis. In this case the position and orientation of the central longitudinal axis are self-evident. In the preferred embodiment, the soft target movement platform is effectively square. In this case, the position and orientation of the central longitudinal axis is analogous. However for the avoidance of doubt, it can be said that the axis is transverse the axles and midway between any two of the wheels on one or other of the axles.

By "independent of each other" steering is intended that the front or rear one(s) of the wheel(s) are steered whilst the rear or front wheel(s) are not steered, i.e. remain straight ahead, with the centre of steering being on the non-steered one of the axes.

By "dependent of each other" steering is intended that the steering of individual wheels is a function of the steering of the others. Examples are:

steering of all, usually four, wheels equally, whereby platform steers along an oblique straight axis, steering of the front wheel(s) equally and oppositely to that of the rear wheels, whereby the centre of steering is on an transverse axis midway between the axles;

steering of the front wheels to a great extent than the rear wheels, whereby the centre of steering is on an transverse axis behind the rear axle.

It will be understood that references above to equal steering include allowance for Ackermann steering whereby actual angles to which the wheels are steered differ for wheels inboard and outboard with respect to the centre of steering.

To help understanding of the invention, a specific embodiment thereof will now be described by way of example and with reference to the accompanying drawings, in which.

Figure 1:
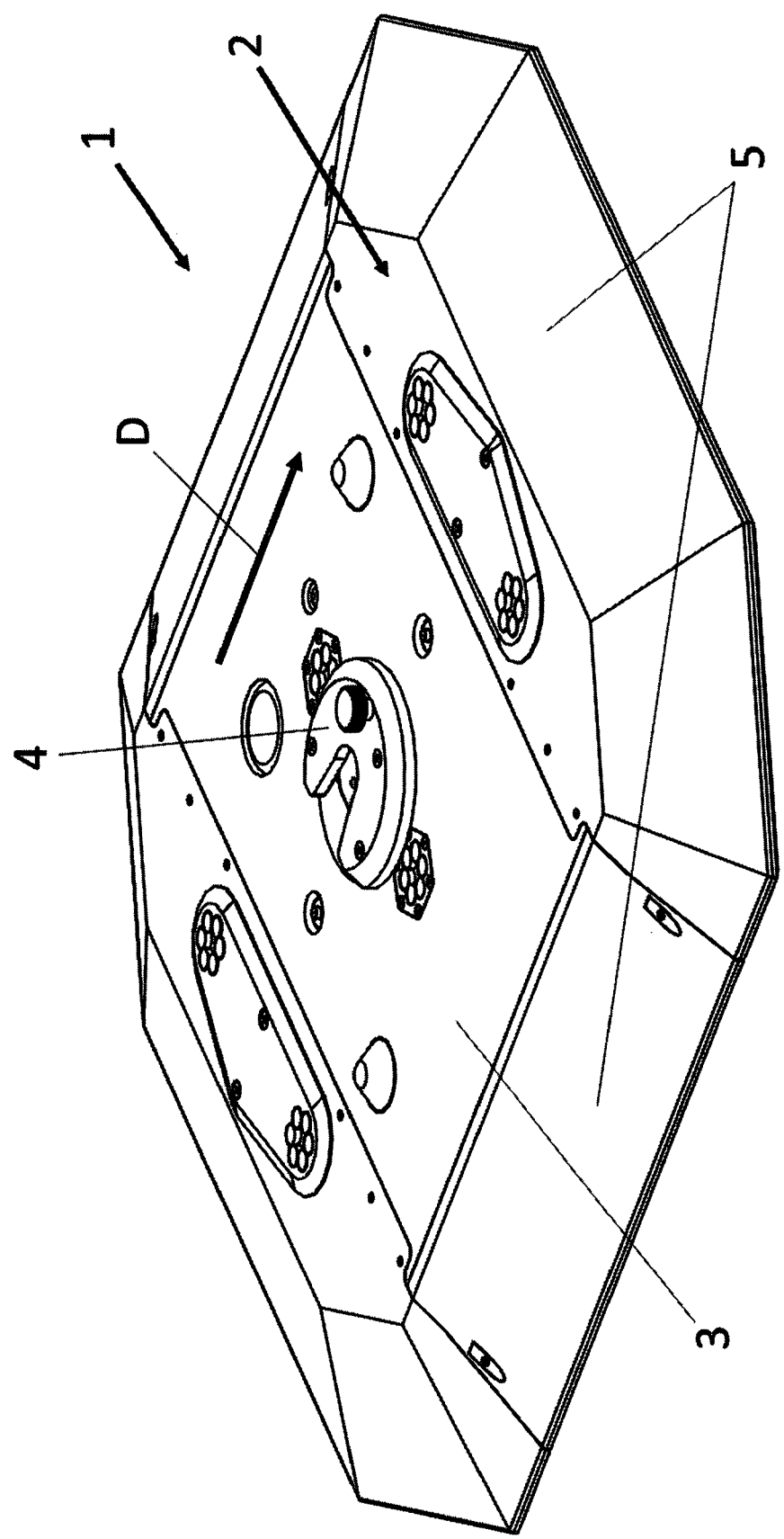
FIG. 1 is a perspective view of a soft target movement platform in accordance with the invention.
Figure 2:
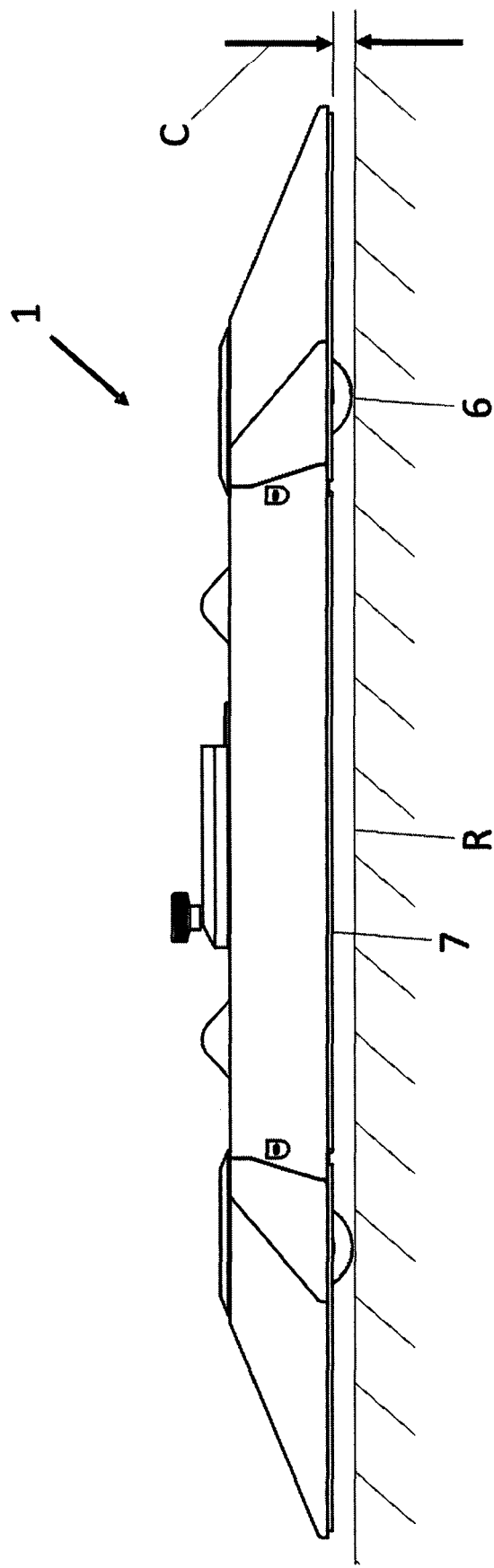
FIG. 2 is a side view of the platform of FIG. 1.
Figure 3:
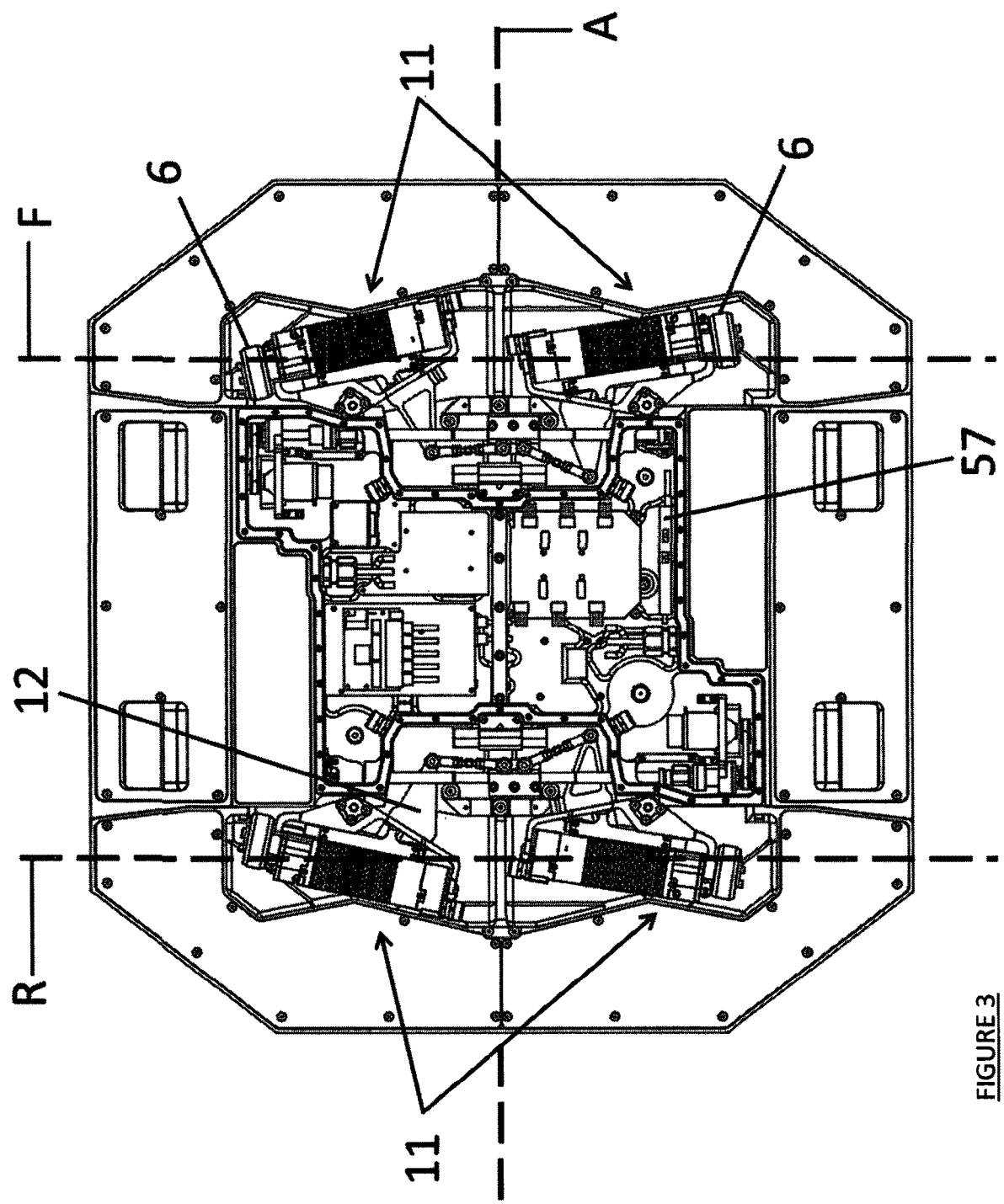
FIG. 3 is an underneath view (without an underside cover) of the platform of FIG. 1.
Figure 4:
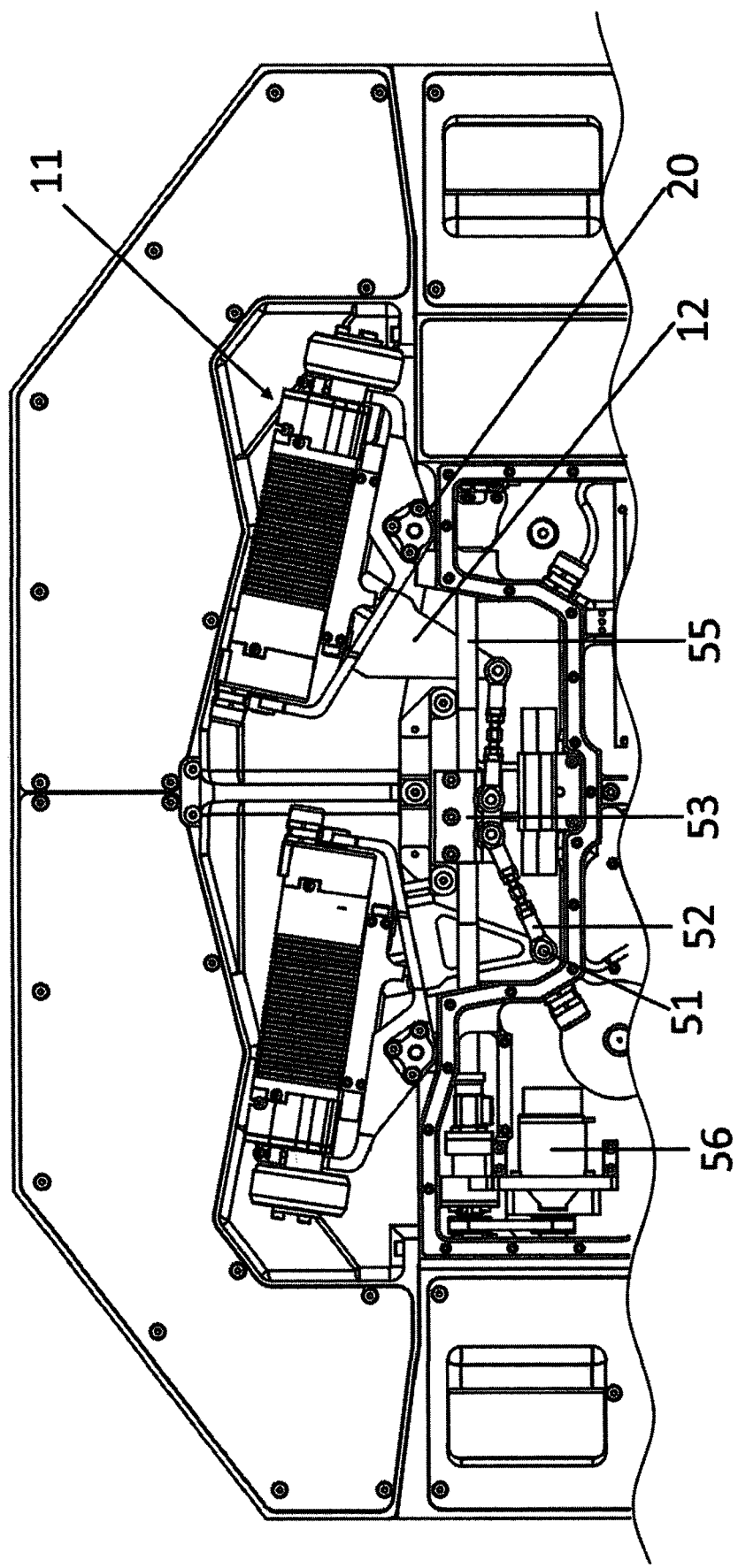
FIG. 4 is view similar to FIG. 3 with only part of the platform shown, but in greater detail.

Referring to the drawings, a soft target movement platform 1 has:

A body 2 provided with a deck 3 on which a soft target (not shown) can be mounted, via a clamp 4. The target may be longer than the platform. Thus a simulated pedal or motor bicycle can be supported by a platform that is shorter than it. Typically the platform is of a size to accommodate the footprint of a simulated pedestrian;

Ramps 5 around the central deck 3, to allow an automobile wheel to run over the platform in the event that a simulated collision occurs;

Wheels 6 normally extending by a small amount below edges 6 of the ramps providing a small ground clearance C between the ramps and a road surface R on which the platform is being used.

The illustrated embodiment has four wheels 6, provided in respective handed but otherwise identical drive units 11. Each has generally "h" shaped carrier 12, with the upper limb being a steering arm 14, the two lower limbs 15 having motor journals 16 at their ends 17 and the middle portion 18 carring a pair of inwardly directed king pin studs 19 which engage in a tongue 20 fixed to the underside of the deck 3.

Whilst the limbs are described with reference to their position in the "h", they are of course arranged generally horizontally in use of the platform. The motor journaled between the limbs 15 is a DC motor 21, capable of high revolutions per minute for driving the platform at simulation speeds without rotational speed reduction to the wheels, which are necessarily small. The deck is of the order of 13 mm above the road R in typical use, in other words C is typically 13 mm. The journals 16 include plain bearings 22 encircling spigots 23 at the ends of a housing 24 of the motor. The journals are concentric with rotor bearings (not shown) within the motor. The drive end spigot 23 is fast with a portion 25 of the housing 24, in which is a 1:1 gear transfer. This has a first gear 26 fast with a motor output shaft 27 and a second gear 28, meshed with the first, and fast with an output shaft 29 to which the wheel 6 is fitted, the gears having equal numbers of teeth.

Figure 5:
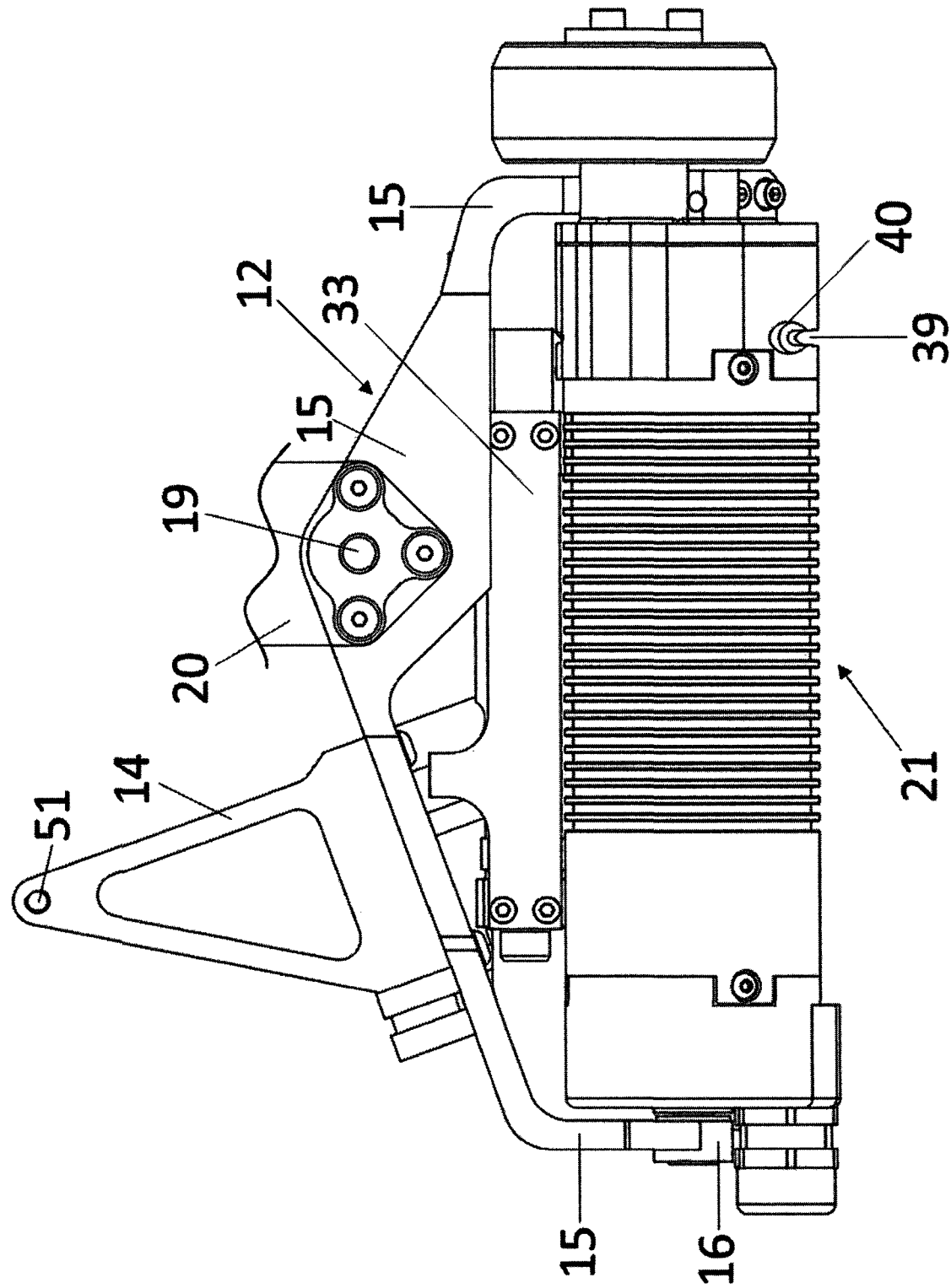
FIG. 5 is an underside view of a drive unit of the platform of FIG. 1.
Figure 6:
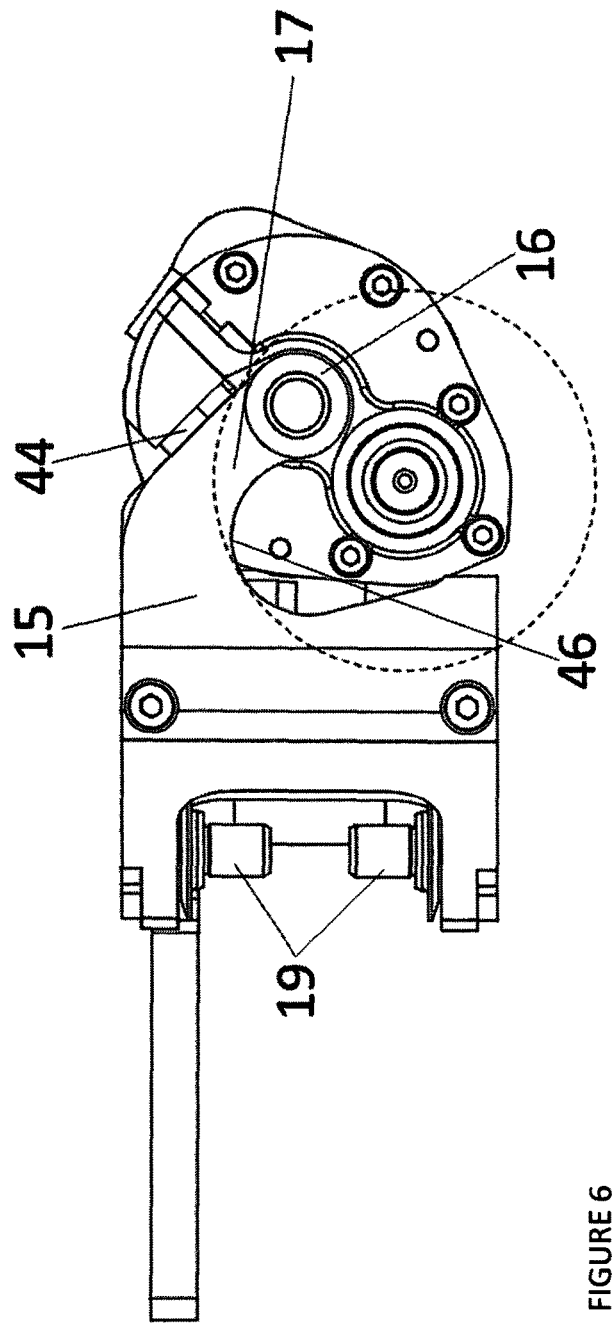
FIG. 6 is a side view of the drive unit of FIG. 5 in rebound position, with its wheel shown in outline.
Figure 7:
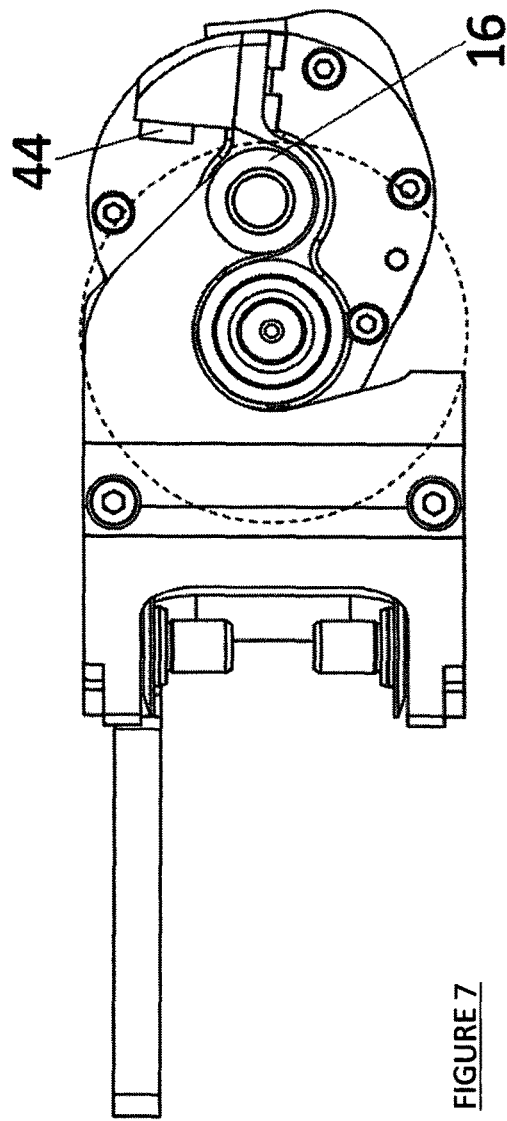
FIG. 7 is view similar to FIG. 6 in bump position.
Figure 8:
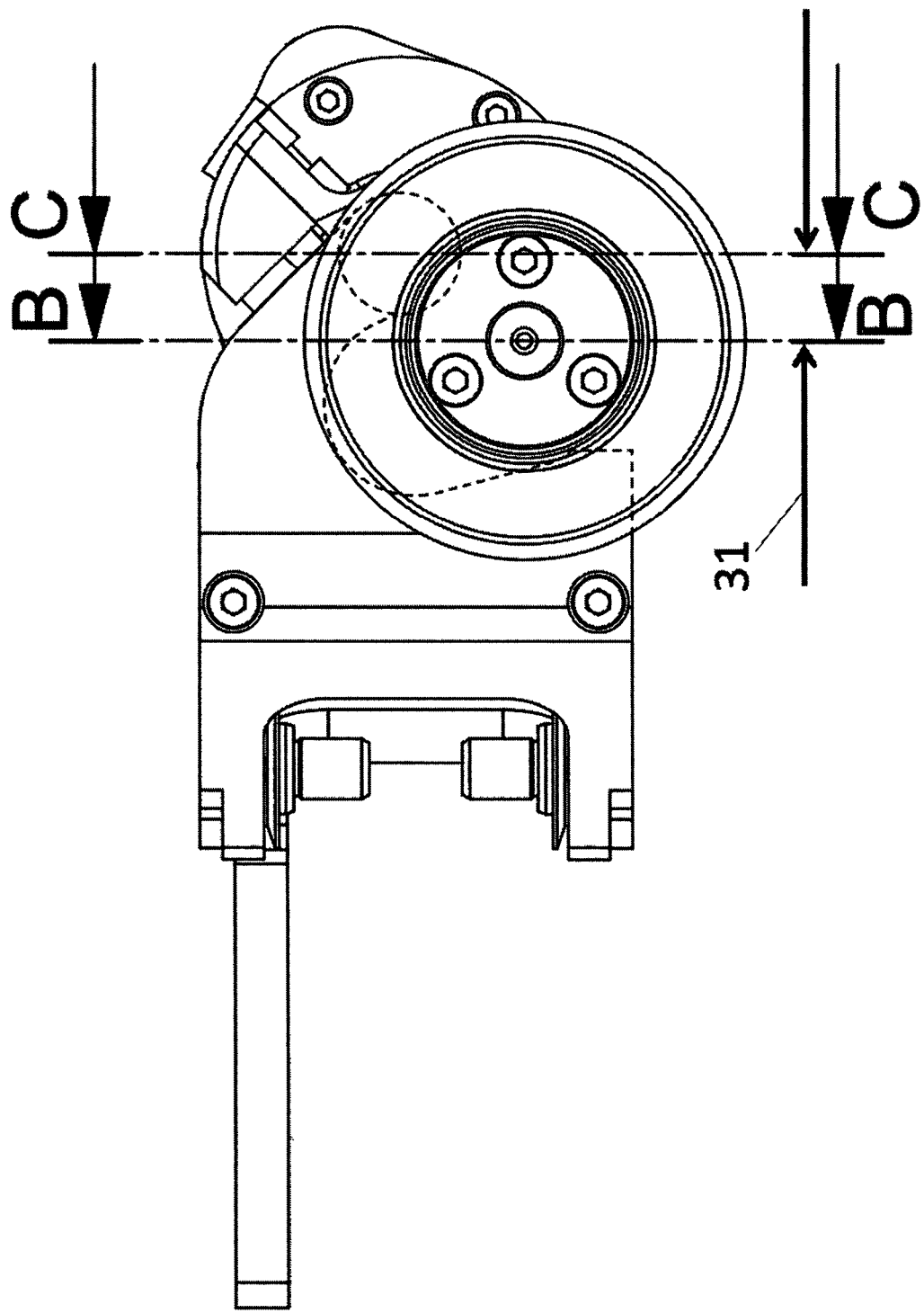
FIG. 8 is a view similar to FIG. 6, including the wheel and showing its lever arm with respect the motor.
Figure 9:
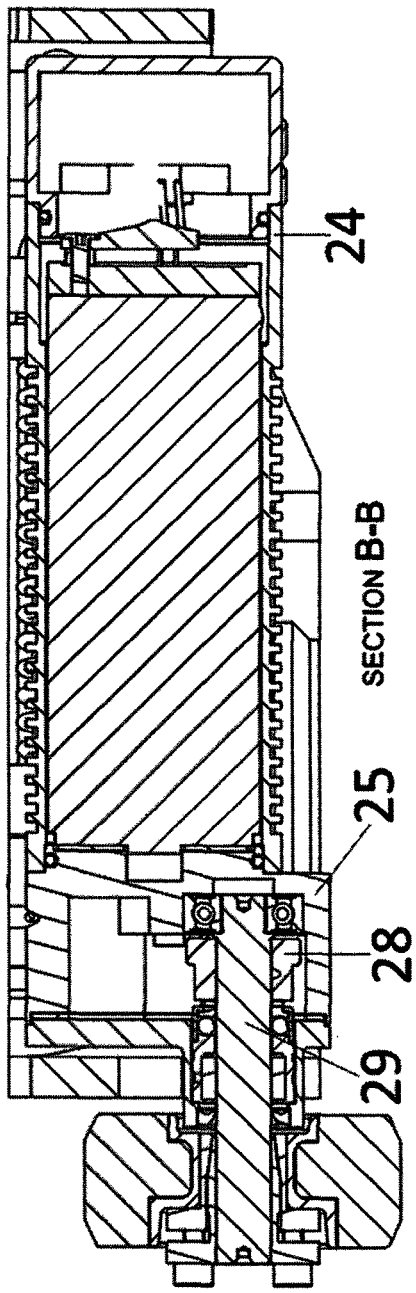
FIG. 9 is a cross-sectional view on the line B-B in FIG. 8, through the centre of the wheel's shaft.
Figure 10:
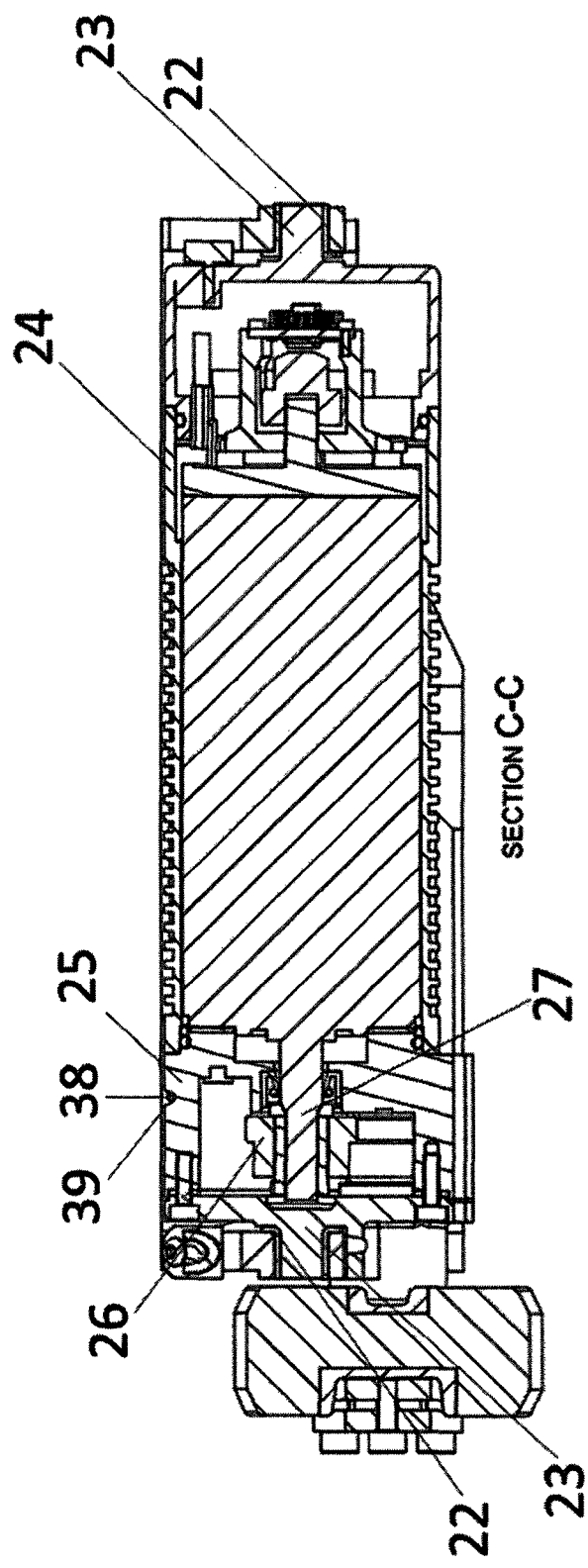
FIG. 10 is a cross-sectional view on the line C-C in FIG. 8, through the centre of the motor's rotor shaft.
Figure 11:
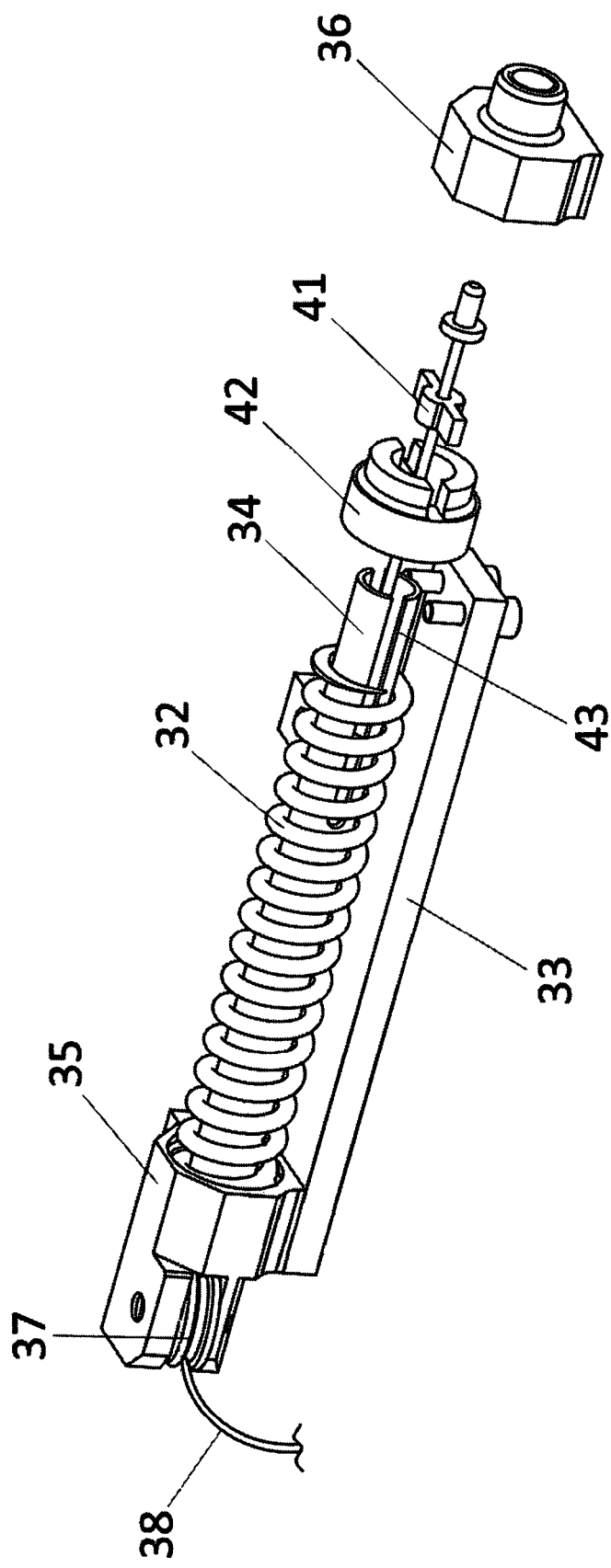
FIG. 11 is a perspective view of the drive unit's suspension spring.
Figure 12:
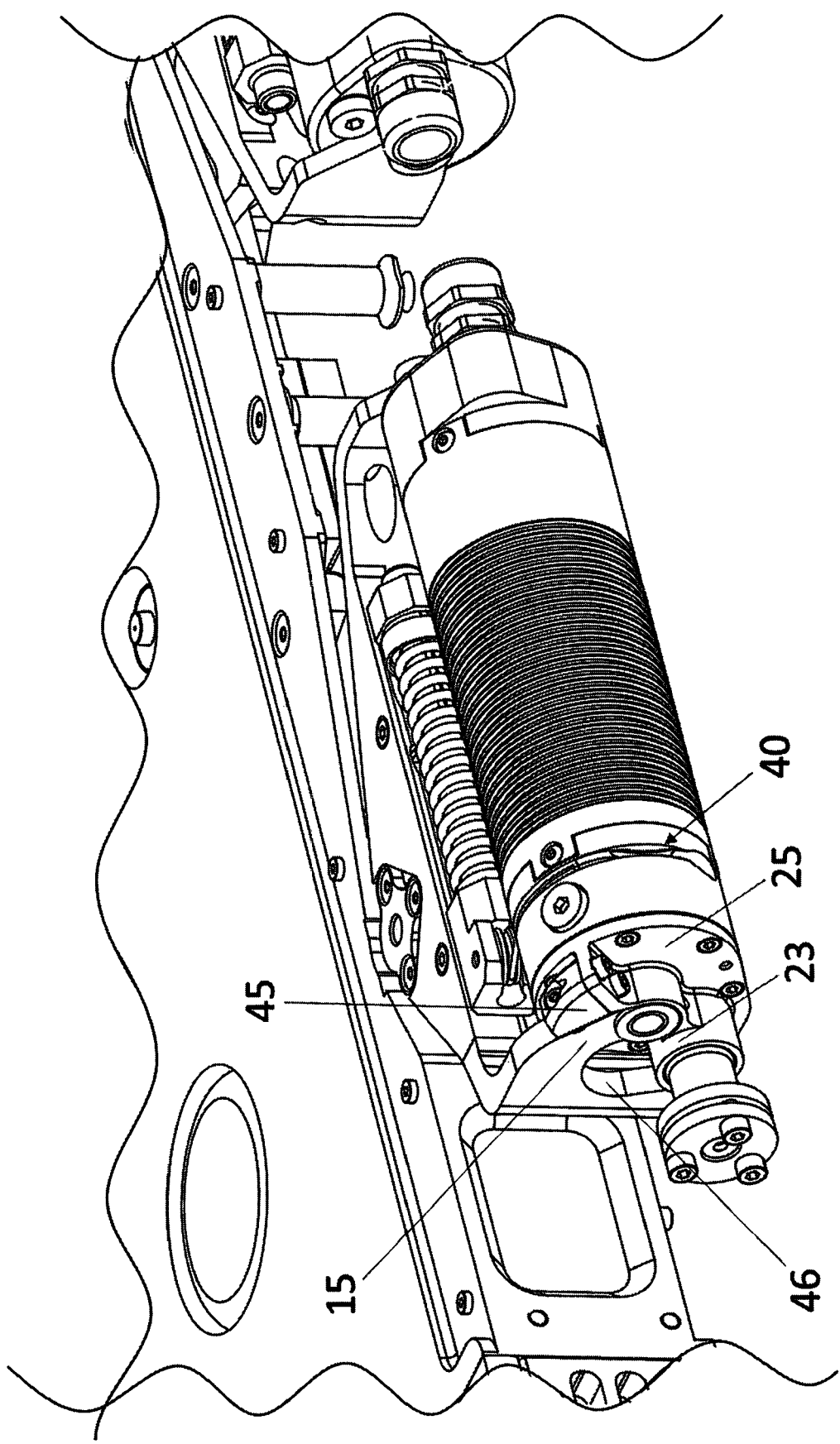
FIG. 12 is a perspective view of the drive unit's entire suspension.

As seen in FIG. 8, the wheels 6 are arranged at a lever arm 31 with respect to the motor, whereby wheel loads tend to turn the motors with respect to the carriers. This turning is resisted at each drive unit by a spring 32, not visible in FIG. 5, but arranged above a plate 33 fast with the carrier portion 18. Above the plate is a rod 34 located between two lugs 35,36 fixed to the plate 33. The lug 35 at the wheel end of the unit carries a pulley 37 around which a cable 38 passes from a capstan groove 39 in the motor housing. An end of the cable is fast at a point 40 at the end of the groove remote from the pulley. The other end passes through the rod and bears at its end remote from the pulley on a knuckle 41 pressing on a spring cup 42 carried on the rod. This has slots 43 for the knuckle to extend from. It will be appreciated that upwards movement of the wheel tensions the cable and draws the spring cup along the rod towards the pulley. The cup 42 transfers wheel-load-induced force in the cable to the spring.

In normal, unladen state of the platform, a rebound stop 44 on a bracket 45 fast with the motor-housing portion 25 bears against the respective one of the limbs 15 to retain tension in the cable 38 and compression in the spring 32. If the platform is run over, the edges 7 of the ramps are grounded with the wheels being driven upwards with respect to the pressed down platform. This action turns the motors, with compression of the springs. Thus damage to the drive units is avoided. It will be noted that the wheel end limb 15 is scalloped at 46, to accommodate the spigot 23 of the motor-housing portion 25 through which the wheel shaft 29 passes.

Turning now from suspension of the platform to its steering, the four drive units are provided as a front pair and a rear pair in notional front and rear axles F,R. When all the wheels are all aligned with a central longitudinal axis A of the platform their individual axes f,r are aligned. The steering arms 14 are pivoted at their ends 51, which are inwards directed, to the outer ends of tie rods 52. The inner ends of these are pivoted to a displacement member 53. This is carried on a lead screw 55, itself driven by a servo motor 56. There is no mechanical connection between these steering components for the front axle and those for the rear axle. Indeed the mechanical components, drive, suspension and steering, are identical for both axles and their designation as front and rear is arbitrary based on the direction in which the platform is set up to travel when a remote control is activated. The platform will normally have a forwards marking D on it.

It will be noted that with the steering at both axles being mechanically independent, the servo motors can operated either For steering of the front axles carriers and wheels only, as for instance a trolley with front castor wheels or For steering of the rear axles carriers and wheels only, as for instance a trolley with rear castor wheels or For steering of the front and rear axles carriers and wheels only, as for instance a trolley with front and rear castor wheels, with random steering at the axles.

The separation of the axles of the platform can be expected to be greater than those of a shopping trolley, so for a front castor wheel trolley, the platform will simulate maneuvering by steering with an instantaneous centre of steering at the trolley's rear axle, i.e. behind the platform. For trolley rear wheel steering, the opposite is needed.

Figure 13:
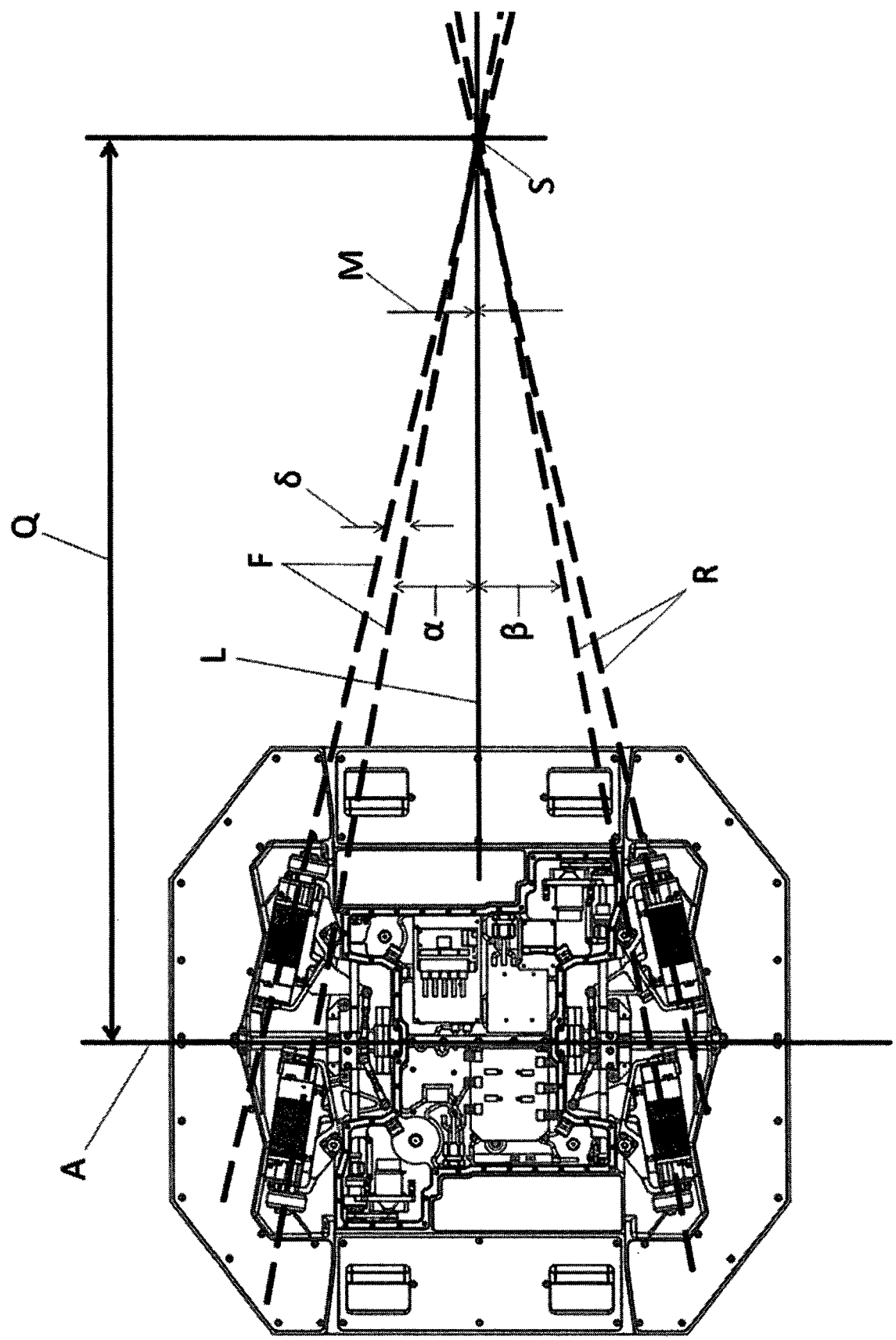
FIG. 13 is a steering angle diagram for the platform.

How this is achieved can be understood with reference to FIG. 13, which shows:

The front wheels steered to an angle $\alpha$—with a small Ackermann difference 8 in a between the left and right wheels, The rear wheels steered to an angle $\theta$, The point of intersection of the front and rear wheel axes' intersection, i.e. the centre of steering S (shown as a single point although in practice the intersection is likely to be a small quadrilateral, giving rise to a minor amount of wheel scrub)

The point S is offset laterally, that is to the side of the central axis A by a distance Q, designating the quantum of steering. The smaller Q is, the greater is the angular rate of change of direction of the platform and The point is offset longitudinally, that is in front or behind the mid-line L between the front and rear axles F,R, by a distance M, designating the mode of steering. It will be appreciated that for a trolley for instance giving rise to a fixed M in accordance with its size and whether it is front or rear wheel steering, the front and rear wheels of the platform will be steered to different angles $\alpha$ and $\beta$ according to the desired Q. That said, the actual values of the angles $\alpha$ and $\beta$, i,e the displacement of the front and rear steering members 53 and the angular rotation of the servo motor 56 are readily determined for desired values of Q and M.

In the particular case of FIG. 1, M is equal to zero, i.e. the point of axes intersection/centre of steering S is on the mid-line L. In this case the wheels are steered equally and oppositely, with $\alpha=-\beta$. This mode gives the tightest turning circle for the platform, which is useful in simulating a pedestrian making a tight turn.

The servo motors are under the control of a controller 57. Normally it will have a mode set initially as a value of M and receive steering magnitude signals Q from the remote control. Thence it calculates and applies servo signals appropriate for $\alpha$ and $\beta$. The actual control programming is expected to be within the capabilities of the skilled reader.

The invention is not intended to be restricted to the details of the above described embodiment. For instance the clamp 4 can be replaced by devices which release when a force threshold has been reached, such as magnetic holders or Velcro pads or straps. The 1:1 gear drive of the wheels by their motors can be replaced by a reduction drive or even an over-drive according to the motors' performance and the platform's required speed.

The invention claimed is:

1. A soft target movement platform comprising:
at least one drive unit, each drive unit having:
a motor carrier,
a drive motor, journaled in the motor carrier about an axis central and longitudinal of the drive motor,
a drive wheel drivingly connected to the drive motor, with the drive wheel's axis of rotation offset from the central and longitudinal axis by a lever arm having a horizontal extent in use, whereby wheel load tends to rotate the drive motor with respect to the motor carrier about the central and longitudinal axis, and
a spring acting between the drive motor and the motor carrier to counteract the wheel load rotation.

2. The soft target movement platform of claim 1, wherein the drive wheel's axis of rotation and an axis of a rotor of the drive motor are coaxial with an offset to the axis of the rotor and the drive wheel's axis of rotation from the central and longitudinal axis.

3. The soft target movement platform of claim 1, wherein:
the central and longitudinal axis of the drive motor and an axis of a rotor of the drive motor are coaxial;
the drive wheel's axis of rotation is offset from the coaxial axes; and
drive transfer means is provided between the drive motor's rotor and the drive wheel, wherein the drive transfer means provides the lever arm.

4. The soft target movement platform of claim 1, wherein the spring is a torsion spring acting between the motor carrier and a body of the drive motor.

5. The soft target movement platform of claim 1, wherein the spring is a compression or tension spring acting longitudinally of the axis central and longitudinal of the drive motor and reacting wheel load applied to it via a mechanism to a body of the drive motor.

6. The soft target movement platform of claim 5, wherein the mechanism is a linkage including a bell crank.

7. The soft target movement platform of claim 5, wherein the mechanism comprises a cable passing around a direction changing pulley and onto a capstan portion of the body of the drive motor.

8. The soft target movement platform of claim 1, wherein a single drive unit or a lesser number of drive units than a number of wheels of the soft target movement platform are provided, with non-driven wheels of the soft target movement platform being sprung in a different manner or the same manner without provision of drive motors for the non-driven wheels.

9. The soft target movement platform of claim 1, wherein every wheel of the soft target movement platform is a drive wheel of a said drive unit.

10. The soft target movement platform of claim 1, wherein for steering of the soft target movement platform, one or more of the at least one drive unit are steerable by providing the motor carriers of the one or more of the at least one drive unit with steering pivots.

11. The soft target movement platform of claim 10, wherein the steering pivots are at a wheel end of the respective motor carriers, placing them close to a ground contact patch of the drive wheel.

12. The soft target movement platform of claim 10, wherein the steering pivots are placed close to the middle of the respective motor carriers, to restrict an overall space requirement for the drive motor, drive wheel, and motor carrier in total steering movement.

13. The soft target movement platform of claim 1, wherein:
at least one front wheel at a front axle is steerable;
at least one rear wheel at a rear axle is steerable; and
a mechanism is provided for selective steering of the front and rear steerable wheels to respective steering angles, independently or dependently of the rear and front wheels for steering the soft target movement platform substantially about a point of intersection of axes of the front and rear steerable wheels, the mechanism being such that the point of intersection is selectively moveable laterally for quantum of steering movement and backwards and forwards for mode of steering movement, and means is provided for controlling the mechanism for quantum and mode of steering.

14. The soft target movement platform of claim 13, wherein:

the soft target movement platform has a central longitudinal axis; and the front and rear steerable wheels are arranged as three or four wheels of which:

at least one wheel is arranged at a front axle position along the central longitudinal axis of the soft target movement platform, at least one other wheel is similarly arranged at a rear axle position, and a remaining wheel or wheels is/are arranged at at least one axle position whereby there are one or two front wheels and one or two rear wheels.

15. The soft target movement platform of claim 14, wherein a single wheel provided at an axle position is on the central longitudinal axis of the soft target movement platform.

16. The soft target movement platform of claim 14, wherein two wheels provided at an axle position are:

substantially equally spaced on either side of the central longitudinal axis of the soft target movement platform, and provided at substantially the same position along the central longitudinal axis of the soft target movement platform, on a single physical axle, or independently in a notional axle.

17. The soft target movement platform of claim 13, wherein the front axle and the rear axle are substantially at right angles to a central longitudinal axis of the soft target movement platform.

18. The soft target movement platform of claim 13, having a configuration with front and rear wheels on a central axis and balance wheels to either side to keep the soft target movement platform level, the balance wheels being arranged as castor wheels.

19. The soft target movement platform of claim 13, wherein the soft target movement platform is longer in a central longitudinal axis direction than its width, the front and rear axles being transverse to this axis.

20. The soft target movement platform of claim 13, wherein the soft target movement platform is effectively square, a longitudinal axis of the soft target movement platform being transverse the front and rear axles and midway between any two of the front or rear wheels on one or other of the front or rear axles, respectively.

21. The soft target movement platform of claim 13, wherein the mechanism is adapted to steer the at least one front wheel and the at least one rear wheel independently each other whereby, the steering of the at least one front or at least one rear one(s) of the front and rear wheels is not a function of the steering of the at least one rear or at least one front one(s) of the front and rear wheels.

22. The soft target movement platform of claim 13, wherein the mechanism is adapted to steer the front and rear wheels dependently of each other as a function of each other.

23. The soft target movement platform of claim 22, wherein the function relates to one or more of the following:

steering of all wheels equally, whereby the soft target movement platform steers along an oblique straight axis;

steering of the at least one front wheel equally and oppositely to that of the at least one rear wheel, whereby a centre of steering is on an transverse axis midway between the front and rear axles; and steering of the at least one front wheel to a greater extent than the at least one rear wheel, whereby the centre of steering is on an transverse axis behind the rear axle, wherein references to equal steering include allowance for Ackermann steering, whereby actual angles to which the front and rear wheels are steered differ for wheels inboard and outboard with respect to the centre of steering.

* * * * *